US009661001B2

(12) United States Patent
Schumacher

(10) Patent No.: US 9,661,001 B2
(45) Date of Patent: *May 23, 2017

(54) USER INTERFACE FOR SELECTION OF MULTIPLE ACCOUNTS AND CONNECTION POINTS

(71) Applicant: Microsoft Technology Licensing, LLC, Redmond, WA (US)

(72) Inventor: Samantha Schumacher, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,897

(22) Filed: Jun. 29, 2015

(65) Prior Publication Data
US 2016/0057155 A1 Feb. 25, 2016

Related U.S. Application Data

(63) Continuation of application No. 13/293,410, filed on Nov. 10, 2011, now Pat. No. 9,081,974.

(51) Int. Cl.
*G06F 21/00* (2013.01)
*G06F 7/04* (2006.01)
(Continued)

(52) U.S. Cl.
CPC ........ *H04L 63/105* (2013.01); *G06F 3/04842* (2013.01); *G06F 17/248* (2013.01);
(Continued)

(58) Field of Classification Search
CPC ............... G06F 21/10; H04L 2463/101; H04L 2463/103; H04L 2209/603
See application file for complete search history.

(56) References Cited

U.S. PATENT DOCUMENTS 6,876,984 B2 * 4/2005 Tadayon ................. G06F 21/10
705/51
7,085,741 B2 * 8/2006 Lao ......................... G06F 21/10
380/201
(Continued)

FOREIGN PATENT DOCUMENTS

CN 1622519 A 6/2005

OTHER PUBLICATIONS

"Final Office Action Issued in U.S. Appl. No. 13/293,410", Mailed Date: Nov. 14, 2013, 14 Pages.
(Continued)

*Primary Examiner* — Tae Kim

(57) ABSTRACT

Embodiments of the present disclosure provide a user interface that enables a user to more easily identify servers that may be used to set access permissions for content items. The method and system described herein includes receiving user credentials that are associated with a user. In response to receiving the user credentials, one or more servers associated with the user credentials are displayed. The one or more servers are configured to manage information rights for a content item created by the user. Upon receiving a selection of one of the one or more servers, a list of one or more templates supported by the selected server is displayed to the user. The one or more templates identify information rights that may be applied to the content item.

20 Claims, 6 Drawing Sheets

(51) Int. Cl.
| | | |
|---|---|---|
| *G06F 17/30* | (2006.01) | |
| *H04L 29/06* | (2006.01) | |
| *G06F 21/10* | (2013.01) | |
| *G06F 21/60* | (2013.01) | |
| *G06F 21/62* | (2013.01) | |
| *G06F 3/0484* | (2013.01) | |
| *G06F 17/24* | (2006.01) | |

(52) U.S. Cl.
CPC ............ *G06F 21/10* (2013.01); *G06F 21/604* (2013.01); *G06F 21/6209* (2013.01); *H04L 63/08* (2013.01); *H04L 63/102* (2013.01); *H04L 2209/603* (2013.01); *H04L 2463/101* (2013.01); *H04L 2463/103* (2013.01)

(56) References Cited

U.S. PATENT DOCUMENTS

| | | | | |
|---|---|---|---|---|
| 7,177,843 | B2 * | 2/2007 | Nguyen | G06Q 40/08 380/201 |
| 7,206,765 | B2 * | 4/2007 | Gilliam | G06F 21/10 380/201 |
| 7,277,870 | B2 * | 10/2007 | Mourad | G06F 17/3089 380/200 |
| 7,308,573 | B2 * | 12/2007 | Kostal | G06F 21/10 380/229 |
| 7,343,324 | B2 * | 3/2008 | Lao | G06F 17/3089 705/27.1 |
| 7,353,402 | B2 * | 4/2008 | Bourne | G06F 21/10 713/180 |
| 7,549,060 | B2 * | 6/2009 | Bourne | G06F 21/10 380/201 |
| 7,577,906 | B2 * | 8/2009 | Friedrichowitz | G06F 17/243 707/999.008 |
| 7,895,123 | B1 * | 2/2011 | Du | G06F 21/10 705/51 |
| 8,239,682 | B2 * | 8/2012 | Meehan | G06F 21/10 380/28 |
| 8,353,012 | B2 * | 1/2013 | Del Real | G06F 21/6218 705/326 |
| 9,081,974 | B2 | 7/2015 | Schumacher | |
| 2002/0116293 | A1 * | 8/2002 | Lao | G06F 17/3089 705/27.1 |
| 2003/0125976 | A1 * | 7/2003 | Nguyen | G06Q 40/08 705/51 |
| 2004/0044779 | A1 * | 3/2004 | Lambert | G06Q 10/10 709/229 |
| 2004/0054920 | A1 * | 3/2004 | Wilson | H04L 63/0428 726/7 |
| 2004/0158731 | A1 * | 8/2004 | Narin | G06F 21/6263 726/27 |
| 2004/0168077 | A1 * | 8/2004 | Waxman | G06F 21/6227 726/28 |
| 2004/0243819 | A1 * | 12/2004 | Bourne | G06F 21/10 713/193 |
| 2005/0289076 | A1 * | 12/2005 | Lambert | G06Q 10/10 705/59 |
| 2006/0101321 | A1 * | 5/2006 | Friedrichowitz | G06F 17/243 715/255 |
| 2006/0218651 | A1 * | 9/2006 | Ginter | G06Q 40/12 726/27 |
| 2007/0143855 | A1 * | 6/2007 | Gilchrist | G06F 21/105 726/26 |
| 2008/0016537 | A1 | 1/2008 | Little et al. | |
| 2008/0081606 | A1 | 4/2008 | Cole | |
| 2008/0146265 | A1 | 6/2008 | Valavi | |
| 2008/0320599 | A1 * | 12/2008 | Raley | G06F 21/10 726/26 |
| 2009/0019516 | A1 | 1/2009 | Hammoutene et al. | |
| 2009/0241199 | A1 * | 9/2009 | Valenzuela | H04N 21/83555 726/26 |
| 2009/0265278 | A1 * | 10/2009 | Wang | G06F 21/10 705/54 |
| 2009/0288135 | A1 * | 11/2009 | Chang | H04L 63/20 726/1 |
| 2009/0300706 | A1 * | 12/2009 | Ray | G06F 21/604 726/1 |
| 2009/0319529 | A1 | 12/2009 | Bartlett et al. | |
| 2009/0327905 | A1 | 12/2009 | Mascarenhas et al. | |
| 2009/0328134 | A1 * | 12/2009 | Ray | G06F 21/105 726/1 |
| 2010/0070522 | A1 * | 3/2010 | Nazar | G06F 21/105 707/769 |
| 2010/0070552 | A1 | 3/2010 | Parker et al. | |
| 2011/0047079 | A1 * | 2/2011 | Du | G06F 21/10 705/57 |
| 2012/0054824 | A1 * | 3/2012 | Furukawa | G06F 21/6218 726/1 |

OTHER PUBLICATIONS

"Non-Final Office Action Issued in U.S. Appl. No. 13/293,410", Mailed Date: Apr. 25, 2013, 15 Pages.
"Non-Final Office Action Issued in U.S. Appl. No. 13/293,410", Mailed Date: Aug. 15, 2014, 16 Pages.
"Notice of Allowance Issued in U.S. Appl. No. 13/293,410", Mailed Date: Mar. 4, 2015, 8 Pages.
"First Office Action Issued in Chinese Patent Application No. 201210448635.9", Mailed Date: Sep. 29, 2014, 13 Pages.
"Second Office Action Issued in Chinese Patent Application No. 201210448635.9", Mailed Date: Jun. 5, 2015, 8 Pages.
U.S. Appl. No. 13/293,410, Amendment and Response after Allowance filed Jun. 4, 2015, 7 pgs.
"International Search Report and Written Opinion Issued in PCT Application No. PCT/US12/64251", Mailed Date: Jan. 17, 2013, 9 Pages.
"Cloud Services Frequently Asked Questions", Retrieved on: Sep. 7, 2011 Available at: http://web.archive.org/web/20110905082746/http://www.washington.edu/itconnect/teamwork.cloudfaq.html.
"Database Links", Retrieved on: Sep. 7, 2011, Available at: http://docs.oracle.com/cd/B28359_01/server.111/b28310/ds_concepts002.htm.
"IM to Multiple Accounts with Trillian Astra", Retrieved on: Sep. 7, 2011, Available at: http://www.howtogeek.com/howto/2144/im-to-multiple-accounts-with-trillian-astra/.
"Plan External Data Connections for Excel Services", Published on: Jun. 3, 2011, Available at: https://technet.microsoft.com/en-us/library/cc262899(v=office.12).aspx.
"Specifying Credential and Connection Information for Report Data Sources (SSRS)". Retrieved on: Sep. 7, 2011, Available at: https://msdn.microsoft.com/en-us/library/ms160330.aspx.
Barkley, et al., "Supporting Relationships in Access Control Using Role Based Access Control", In Proceedings of the Fourth ACM Workshop on Role-based Access Control, Jul. 29, 1999, pp. 55-65.
Supplementary Search Report Issued in European Patent Application No. 12847348.5, Mailed Date: Jul. 17, 2015, 6 Pages.
"Microsoft Office 2003 Editions Product Guide", Published on: Sep. 1, 2003, Available at: http://www.jmu.edu/computing/news/archive/issues/2003guide.pdf, 168 pgs.
Dridi, et al., Administration of an RBAC System, In Proceedings of the 37th Annual Hawaii International Conference on System Sciences, Jan. 5, 2004, pp. 1-6.
U.S. Appl. No. 13/293,410, Amendment and Response filed Nov. 17, 2014, 12 pgs.
U.S. Appl. No. 13/293,410, Amendment and Response filed Feb. 14, 2014, 13 pgs.
U.S. Appl. No. 13/293,410, Amendment and Response filed Jul. 23, 2013, 11 pgs.
U.S. Appl. No. 13/293,410, USPTO Response mailed Jun. 17, 2015, 2 pgs.
European Communication in Application 12847348.5, mailed Aug. 4, 2015, 1 page.
Chinese 3rd Office Action in Patent Application 201210448635.9, mailed Nov. 30, 2015, 10 pgs.

\* cited by examiner

USER INTERFACE FOR SELECTION OF MULTIPLE ACCOUNTS AND CONNECTION POINTS

CROSS-REFERENCE TO RELATED APPLICATIONS

This application is a continuation of U.S. patent application Ser. No. 13/293,410, now U.S. Pat. No. 9,081,974, filed Nov. 10, 2011, entitled "USER INTERFACE FOR SELECTION OF MULTIPLE ACOUNTS AND CONNECTION POINTS," which application is incorporated herein by reference in its entirety.

BACKGROUND

Document protection enables a user of a computing device to set various protection levels on documents so as to prevent sensitive information contained in the documents from being printed, forwarded, opened, changed or copied by unauthorized users. However, with current user interfaces, it is difficult to set user permissions for various documents in a user friendly and straightforward manner.

It is with respect to these and other general considerations that embodiments of the present disclosure have been made. Also, although relatively specific problems have been discussed, it should be understood that the embodiments disclosed herein should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments of the present disclosure provide a user interface that enables a user to more easily identify servers that may be used to set access permissions for a particular content item. More specifically, the method and system described herein includes receiving user credentials that are associated with a user. In response to receiving the user credentials, a determination is made as to a relationship between the user and one or more servers. In certain embodiments, the one or more servers are configured to manage information rights for a content item created by the user. In response to receiving a request to protect the content item, a list of the one or more servers is presented to the user. Upon receiving a selection of one of the one or more servers, a list of one or more templates supported by the selected server is displayed to the user. The one or more templates identify information rights that may be applied to the content item by the selected server.

Embodiments may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Embodiments disclosed herein are directed to setting user access permissions for various content items created by a user. In certain embodiments, a user is presented with a list of servers that may be used to set user access permissions for the content items. As will be discussed, prior to using a particular server, the user, or a computing device being operated by the user, may be required to have an established relationship with each server in the list of servers. However, in another embodiment, only the computing device that is being operated by the user may be required to have the established relationship. In such cases, each user of the computing device, regardless of which user submitted user credentials to access the computing device, may view and access each of the available servers in the list. Such a configuration may be useful with a multi-tenant computing device where (i) a second user may be using a first user's user credentials to gain access to the computing device but still wants the ability to use servers and templates that are specific to the second user or (ii) where single user has two accounts (e.g., email accounts) at two different companies. In yet another embodiment, if multiple users are using different operating systems accounts, each user's data will be isolated.

Figure 1:
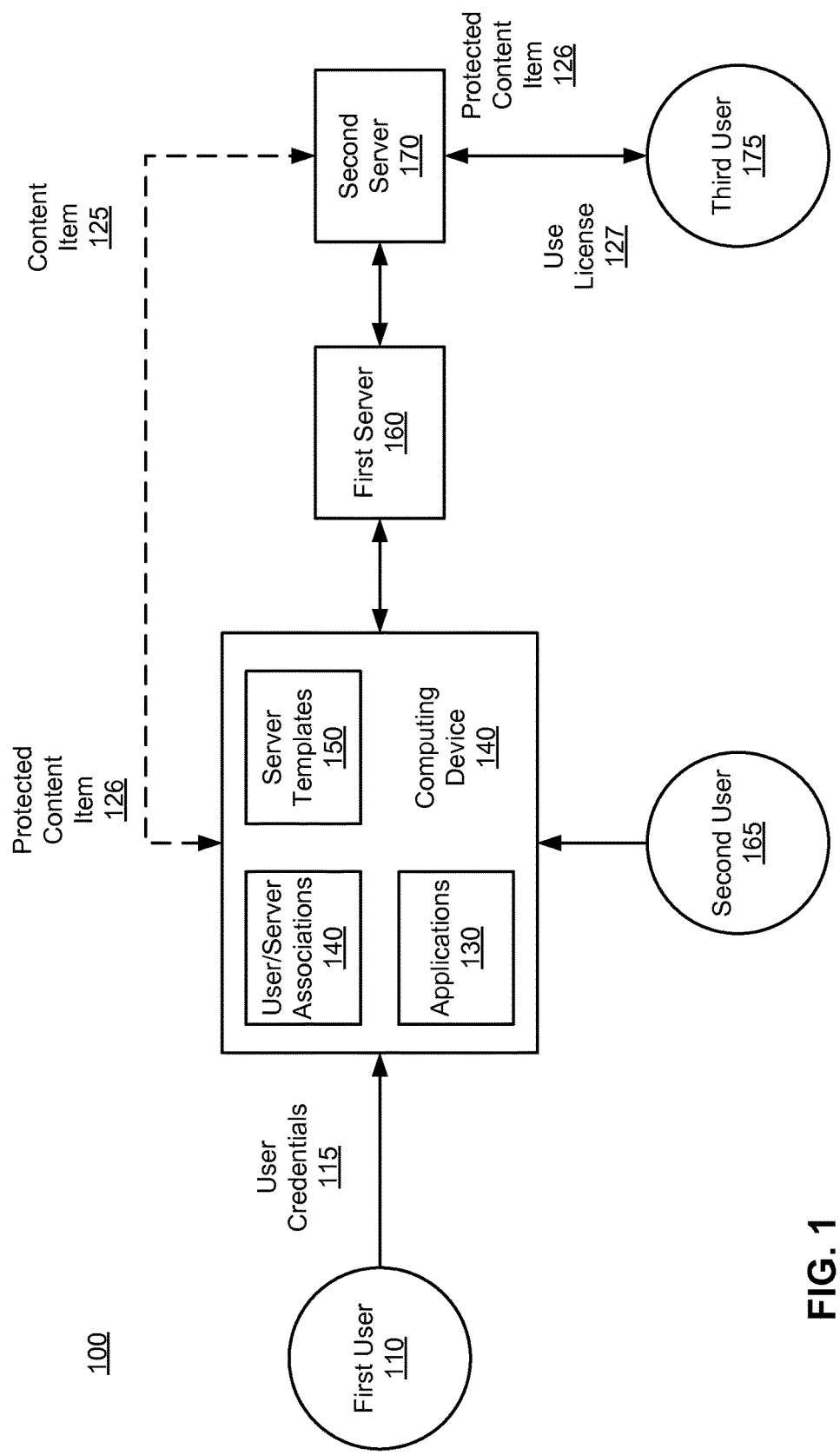
FIG. 1 illustrates a system for setting user access permissions for a content item according to one or more embodiments.

FIG. 1 illustrates a system 100 for setting user access permissions for a content item 125. More particularly, the system 100 may be used to present an information rights management user interface that enables a creator of the content item 125 (e.g., document, presentation, email, workbook etc.) to easily choose a server that may be used to set information rights of the content item 125.

Information Rights Management (IRM) allows a creator or user of the content item 125, or a system administrator, to specify access permissions to the content item 125. IRM helps prevent sensitive information contained in the content item 125 from being distributed, changed, printed, read etc., without permission from the creator of the content item or an administrator of the system from which the content item originated. Once access permissions for a content item 125 have been restricted using IRM, the access and usage restrictions may be enforced regardless of where the content item 125 is located. In certain embodiments, the enforcement may be maintained because the permissions to access the content item 125 is stored in the content item 125 itself.

As shown in FIG. 1, the system 100 includes a computing device 120. The computing device 120 may be a desktop or laptop computer, a tablet computer, a mobile phone, a personal digital assistant and the like. Among other components, the computing device 120 includes an operating system that executes one or more applications 130. The applications 130 may be word processing applications, spreadsheet applications, database applications, email applications, and the like. Each application 130 may also include an information rights management user interface that is displayed to a first user 110 when the first user 110 desires to set access permissions for a content item 125 generated by the application 130.

In certain embodiments, a first user 110 may be required to submit user credentials 115 to one or more of (i) the operating system, in order to log in to the operating system, or (ii) to one or more applications 130 being executed by the computing device 120. The user credentials 115 may include a user name and password or other input that is associated with and identifies the first user 110. For example, the user credentials 115 may include a WINDOWS LIVE ID, an email address and associated password, a username and password, an organization ID, an operating system log on ID etc. In an embodiment, the first user 110 may use single sign-on credentials which enable the first user 110 to access (i) the operating system, and (ii) the one or more applications 130 by entering the user credentials 115 at a single point in time. Alternatively, different user credentials 115 may be required for (i) the operating system, and (ii) the one or more applications 130.

According to one or more embodiments, the computing device 120 may be shared between multiple users, such as, for example, first user 110 and second user 165. Although in certain embodiments a user of the computing device 120 may submit user credentials 115, the submission of user credentials may not be required for all users of the computing device 120. For example, as shown in FIG. 1, second user 165 may access the computing device 120 and utilize one or more applications 130 without providing user credentials. This may be due to the fact that the first user 110 has already logged in to the computing device. In an alternative embodiment, the computing device 120 may not require user credentials from either user. Accordingly, once second user 165 accesses the computing device 120, second user 165 may also protect one or more content items using the methods described herein. Such embodiments will be described in detail below with reference to FIG. 5. In still yet another embodiment, although the computing device 120 may not require user credentials, a sever (e.g., first server 160 or second server 170) may require the user to input user credentials.

In certain embodiments, first user 110 may have access to one or more servers (e.g., first server 160 and second server 170). first server 160 and/or second server 170 may be Rights Management Service (RMS) servers that apply information rights or access permissions for one or more content items 125 created by the first user 110. For example, first user 110 may be employed at a first entity and have an email address associated with the first entity. first server 160 may be configured to apply information rights to one or more content items 125 generated by the first user 110 at the first entity. However, first user 110 may also be a consultant at a second entity and have another email address (or other account) associated with the second entity. Additionally, the second entity may also have a server, such as, for example, second server 170 that may be configured to apply information rights to one or more content items 125 generated by the first user 110 at the second entity.

Because the first user 110 has multiple accounts, each of which is associated with different servers, the user interfaces described herein enable the first user 110 to view each available server associated with the first user 110 or the computing device 120 currently being used by the first user 110, as well as the information rights that each server is able to apply to each content item generated by the first user 110. Although two servers are shown in FIG. 1, it is contemplated that a first user 110 may have access to a single server. It is also contemplated that the first user 110 may have access to, or have established a relationship with, more than two servers.

In certain embodiments, the relationship between the first user 110 and first server 160 and second server 170 may be established by an administrator of the system 100. Continuing with the example above, if first server 160 was operated by a first entity and second server 170 was operated by a second entity, an administrator associated with each entity may establish a trust relationship between the two servers. As a result of the established relationship, the first user 110 may protect a content item 125 using either server using a single user interface. Because the information is presented in a single user interface, the first user 110 may not have to log in to a different computing device, submit different user credentials 115 at a log in screen of an operating system or application, or keep track available servers and associated credentials of each server.

In another embodiment, a relationship between the first user 110 and a server, such as, for example, second server 170 may be established when another user (e.g., third user 175) communicates a protected content item 126 (that was protected using a server to which third user 175 had access such as, for example, second server 170) to the first user 110. When the first user 110 receives the protected content item 126, the first user 110 may be required to submit verification data. Once the verification data is received and accepted, such as will be described below, the computing device 120 of the first user 110 stores the association between the first user 110 and the second server 170 (e.g., user/server associations 140). Thereafter, the first user 110 may utilize second server 170 to manage information rights of one or more content items created by the first user 110.

As discussed above, a first user 110 may manage information rights of a content item using a particular server. For example, if first user 110 creates a content item 125, such as a document, and desires to protect the content item 125 using information rights management, the first user 110, via a user interface associated with the application that created the content item 125, is presented with one or more servers (e.g., first server 160 or second server 170) to which the first user 110 (or computing device 120) has an established relationship with. In certain embodiments, such as when the user has a single operating system account, the user interface will display all user/server connection pairs that have been established on the computing device 120 regardless of which user is currently logged in. In certain embodiments, the server selected by the first user 110 is used to apply information rights policy to the content item 125.

Each server has an associated generic information rights template that is specific to that server. For example, the server's generic template may include "Restricted Access" permissions or "Do Not Forward" permissions. However, it is contemplated that a server may have additional information rights templates with additional permissions. In certain embodiments, each information template is used to set access permissions (e.g., read only permissions, read and write permissions etc.) of the content item 125. Once the access permissions for the content item 125 have been set, the first user 110 may communicate the content item 125 to a recipient user (e.g., third user 175) over a network (not shown) or using other communication means.

When the recipient user receives the content item 125 from the first user 110 and attempts to open the content item 125, the recipient user supplies to the server (e.g., the server that was used to apply the information rights to the content item 125) (i) an RMS account certificate that is embedded in the publishing license that is embedded in the content item that defines the usage policy the content item 125 and (ii) an RMS account certificate, each of which were provided to the recipient user when the relationship between the User's 110 server and the recipient's server or computing device was established. If the recipient user is allowed access to the content item 125, the recipient user receives a use license 127 that establishes that the user has valid access to the content item 125 for a specific amount of time. The recipient user may access the content item based on the use license 127.

As discussed above, each server has associated information rights templates (e.g., templates) that define access permissions or rights that may be set for each content item 125. More specifically, a template contains a usage policy that is used to create the publishing license when the content item 125 is protected using that particular template. For example, the template is used to identify authorized users and the actions the authorized users are allowed to take with the content item. Such actions may include for example, permissions to read, write to, forward, or print the content item 125. In certain embodiments, the template may also set a time limit on each of the permissions listed above. Once the time limit has expired, the recipient user may be required to re-verify their credentials with the server. If the user's credentials are still valid, the user regains access to the content item 125.

As discussed above, the computing device 120 is configured to store each user/server association 140. In certain embodiments, the user/server association 140 includes all servers for which the first user 110 has an established relationship (e.g., via an administrator or by receiving protected content from another user). In certain embodiments, the user/server association 140 is based, at least in part on the user credentials 115. In another embodiment, the user/server associations 140 are stored on the computing device 120 for each user who accesses the computing device 120 and establishes a relationship with a server. Thereafter, each user that accesses the system and desires to protect a content item may view each server with which the computing device 120 has an established relationship. Along with storing each user/server association 140, the computing device 120 may also store one or more server templates 150. As discussed above, each server is associated with a particular set of templates. Therefore, one server may have one set of templates while another sever has a second, different set of templates.

Figure 2:
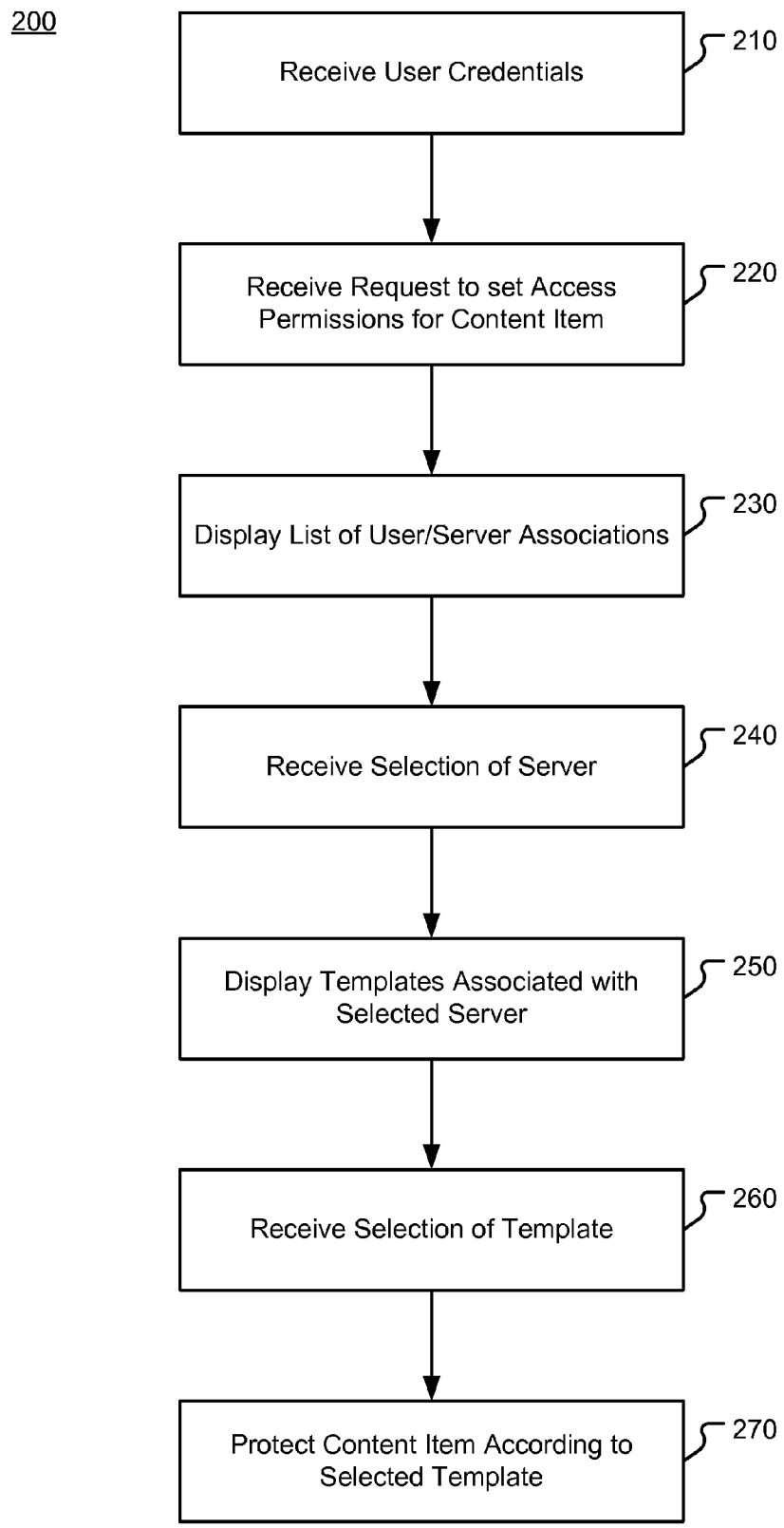
FIG. 2 illustrates a method for setting user access permissions for a content item according to one or more embodiments.

FIG. 2 illustrates a method 200 for setting access permissions of a content item according to one or more embodiments. For example, a user, such as first user 110 (FIG. 1) may employ the method 200 to set information rights policies for a content item 125 using a user interface provided in association with an application 130 that created the content item such as described above with respect to FIG. 1.

Method 200 begins at operation 210 where user credentials are received by an operating system of a computing device or by an application being executed on the computing device. In certain embodiments, the user may not be required to submit user credentials prior to accessing the operating system or one or more of the applications. In such instances, if a user desires to protect a content item, a list of available user and server associations are presented to the user via a user interface such as will be described in greater detail below. In embodiments where user credentials are required, a user may submit single sign-on credentials that enable the user to access the operating system and/or one or more applications that the user is authorized to use.

Once the user credentials are received, flow continues to operation 220 in which a request to set access permissions for a content item is received (e.g., by the computing device). In response to the request, a user interface is displayed to a user. In certain embodiments, the user interface is associated with an application that created the content item to be protected. As part of the user interface, a list of one or more user/server associations is output on the user interface. In an embodiment, the list of user/server associations is based on a trust relationship between entities or servers that is set up by an administrator. In such embodiments, the administrator may set up the trust relationship for each user of the computing device (e.g., in multi-tenant scenarios) or for select users of the computing device. In another embodiment, the list of user/server associations is established when a user of the computing device receives a protected content item such as described above. Thus, if a user (or multiple different users in a multi-tenant environment) received protected content items from two different servers, a user/server relationship would be established between each user/server pair. As discussed above, the list of user/server associations may be maintained and stored on the computing device. In another embodiment, the list of user/server associations may be stored remotely and accessed by the computing device over a network connection or other communication channel.

In certain embodiments, it may be determined by the computing device that, based on user credentials of a particular user, the user has access to a single server with which to protect a content item. In such cases, the user interface does not display the single available server. Instead, the user interface may be configured to display a list of one or more templates associated with the single server.

Figure 3:
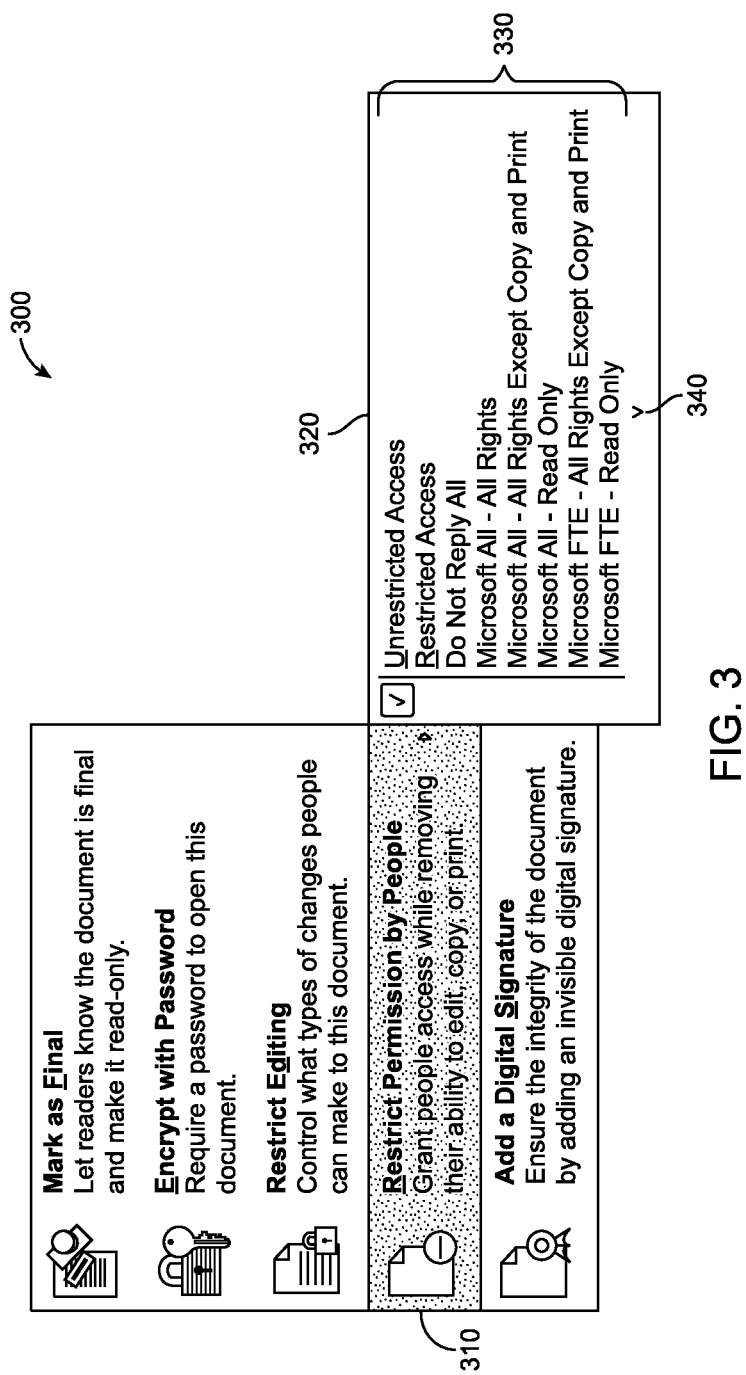
FIGS. 3, 4, and 5 illustrate exemplary user interfaces for setting user access permissions of a content item according to one or more embodiments.

For example, referring to FIG. 3, FIG. 3 illustrates a user interface 300 that displays one or more templates that are associated with a single server. The association between the single server and the user may be based, at least in part, on the user credentials submitted by the user. In another embodiment, the association between the user and the server may be based on the computing device, or the user, having previously established a relationship with the server (e.g., via an administrator, receiving a protected content item, etc.).

As shown in FIG. 3, upon selection of an option to restrict access permissions 310 of a content item, a template list 320 having one or more templates 330 is presented on the user interface 300. For example, as shown in FIG. 3, the template list 320 includes various different templates such as, "Unrestricted Access," "Restricted Access," "Do Not Reply All," etc. The template list may also include other templates that are specific to certain products. For example, one product may include a "Do Not Forward" template that is specific to that product or version. In certain embodiments, the templates 330 may be defined by an administrator. In another embodiment, the templates 330 may be defined by a user. In still yet another embodiment, the templates 330 may be predefined by the application that generated the content item.

Once the template list 320 has been presented to the user, the user may select a template 330 from the template list 320 to set the desired access permissions for the content item. If the desired template 330 is not displayed in the template list 320, the user may select an icon 340 which presents additional available templates 330 to the user (e.g., by expanding or scrolling the list of templates 330).

Figure 4:
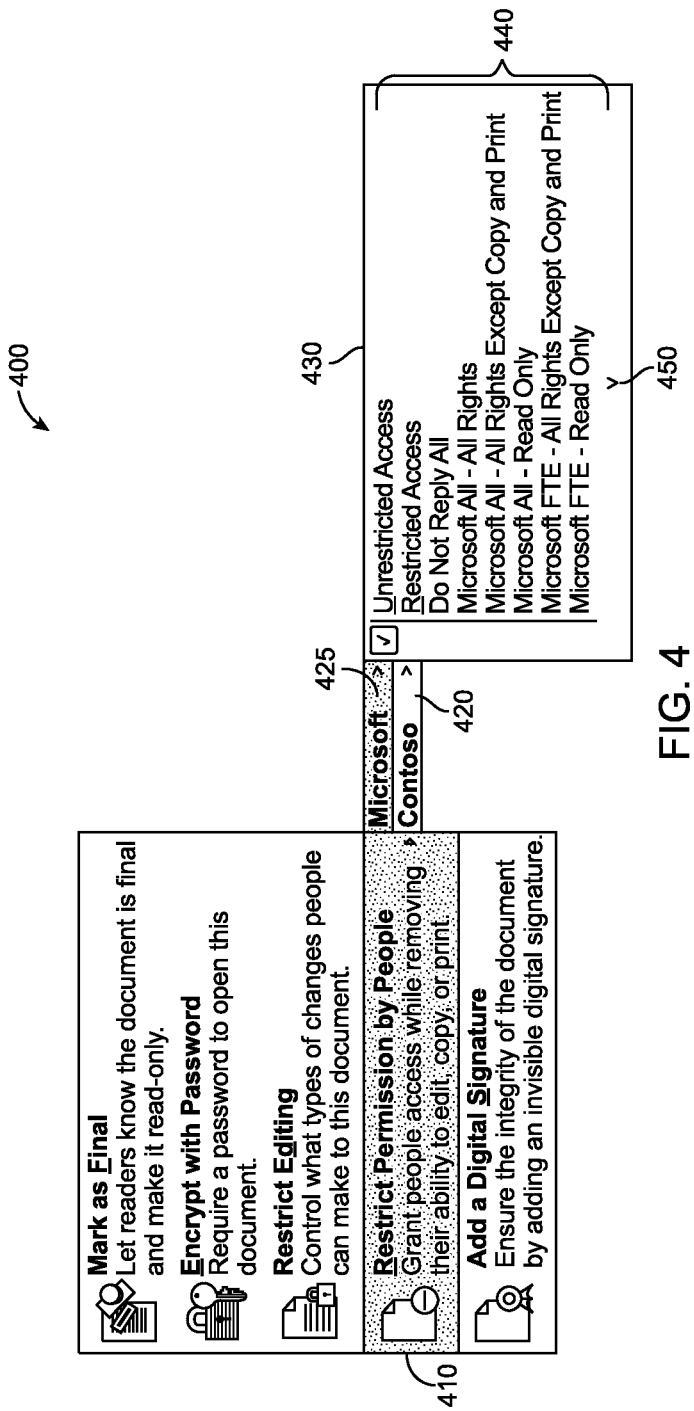

Referring back to FIG. 2, as discussed above, in response to a user request to set access permissions for a particular content item, a user interface is displayed 230 that lists the user/server associations. In response to receiving 240 a user selection of a particular server, a list of templates associated with the selected server is displayed 250 to the user. In certain embodiments, and as shown in FIG. 4, the list of servers and associated templates are displayed in a nested configuration. Such a configuration enables the user to simultaneously view each available server and to view templates of each available server in a single user interface. An exemplary embodiment is shown in FIG. 4.

Referring to FIG. 4, FIG. 4 illustrates an exemplary user interface 400 that displays a list of servers 420 that are available to the user. In certain embodiments, the list of servers 420 is generated and displayed based on the user credentials submitted by the user. In another embodiment, the list of servers 420 is based on previously established relationships between each of the servers in the list of servers 420 and the computing device currently in use. In multi-tenant environments, (e.g., where a first user and a second user share a single computing device), a first user may be able to see choices for servers associated with the second server and vice versa. In other embodiments, the list of available servers is filtered to show only user/server combinations specific to the user associated with user credentials used to authenticate the user to the computing device.

In an embodiment, when a user wishes to restrict access rights of a content item, the user accesses a user interface 400 and selects an option to restrict the access rights 410 of the particular content item. As discussed above, the user interface 400 may be associated with an application that was used to generate the particular content item. In response to the user selection, a list 420 of one or more servers 425 is displayed via the user interface 400.

In the exemplary user interface 400 illustrated by FIG. 4, this particular user has access to both a "Microsoft" server and a "Contoso" server. Therefore, this particular user, or the computing device currently being used by the user, has, at one point in time, established a relationship with each of the servers such as was described above with respect to FIG. 1. As a result of having an established relationship with each server, this particular user also has access to the templates for each server.

In response to the user selecting one of the servers 425 from the list of servers 420 (e.g., the "Microsoft" server), a template list 430 having one or more templates 440 is provided to the user via the user interface 400. As shown in FIG. 4, the list of servers 420 and the list of templates 430 are displayed in a nested configuration. Such a configuration allows the user to easily navigate between each of the servers without having to re-enter user credentials each time the user desires to access a different server.

For example, although the "Microsoft" server in the list of severs 420 is currently selected, the user may select the "Contoso" server on the same interface 400. Once the "Contoso" server has been selected, the user interface 400 displays one or more information rights templates associated with the user's "Contoso" account. As discussed, this list of templates may be different from the list 430 shown for the "Microsoft" server. If a desired template 440 is not displayed in the list of templates 430, the user may select an icon 450 to view additional templates that are available for the selected server 425.

Referring back to FIG. 2, once the available information rights templates have been displayed to the user, a selection of the desired template is received 260 (e.g., by the computing device). Access to the content item is then protected 270 by the selected server based on the selected template.

As discussed above, a user may be required to submit user credentials prior to accessing an operating system or an application on the computing device. However, in another embodiment, a user may not be required to submit user credentials. In such instances, the current user of the computing device may still view and select one or more servers and the set of information rights templates that are associated with each server. An exemplary user interface 500 that illustrates such an embodiment is shown by FIG. 5.

In an embodiment, a user of a computing device may have access to and view one or more available servers that are configured to set access rights for a content item even if the identity of the current user is unknown (e.g., the current user has not submitted user credentials). For example, if a current user of a computing device desires to restrict access to a content item, the current user selects, via the user interface 500, an option to set access rights 510 for a particular content item. In certain embodiments, the user interface 500 is associated with an application that was used to generate the content item. In response to the selection to restrict access 510 to the content item, the user interface 500 displays a list of servers 520 that have, at one time, been associated with either a user of the computing device or the computing device itself. As discussed above, the user/server association may have been made by one user logging in to the computing device and establishing a relationship with one or more servers such as described above. In another embodiment, the relationship between the user and servers may have been established as a result of a user of the computing device having received a protected content item.

Figure 5:
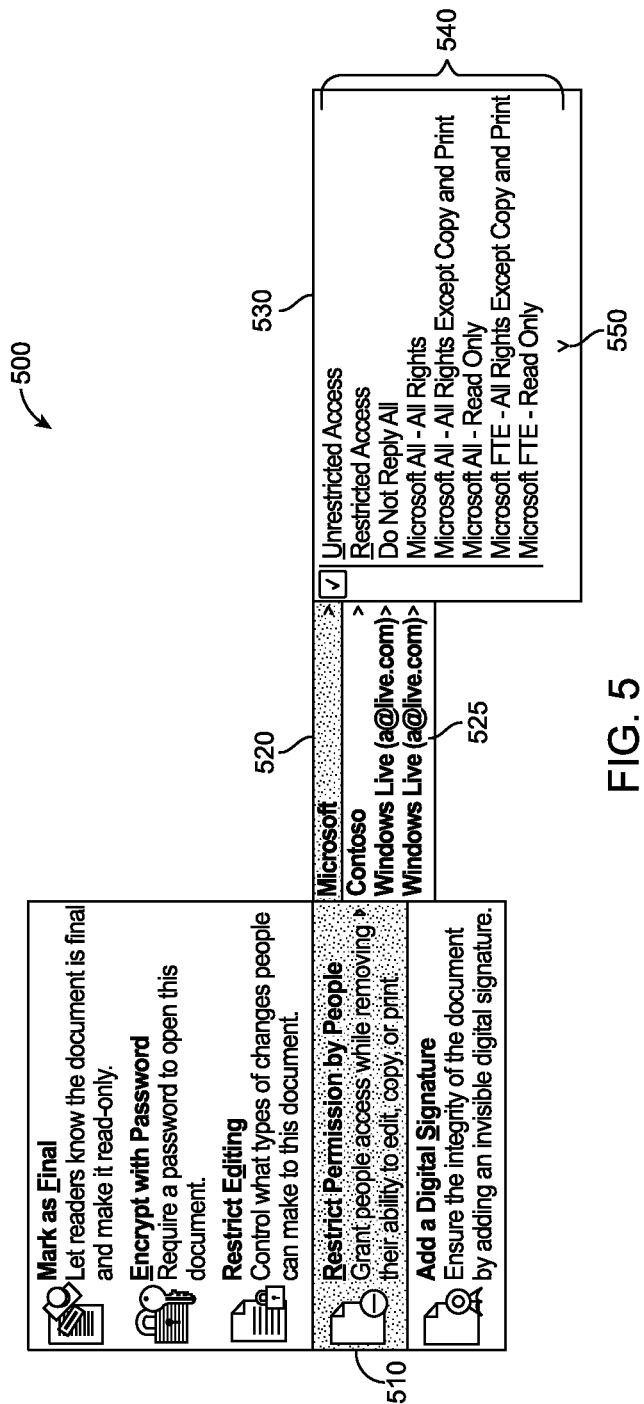

For example, as shown in FIG. 5, the list of servers 520 may include a "Microsoft" server, a "Contoso" server, and two "Windows Live" servers. Although specific servers have been mentioned and shown in FIG. 5, the servers mentioned are for illustrative purposes and it is contemplated that may different servers may be used. However, because each server is associated with a particular user, and because the current user has not presented user credentials in this exemplary embodiment, the computing device does not know which user is currently accessing the computing device. As a result, additional identifiers may be included in the list of servers to assist the user in selecting the correct server.

For example, as shown in FIG. 5, each of the "Windows Live" servers in the list of servers 530 includes an identifier 525 such as, for example, an email address (e.g., a@live.com and b@live.com). Using the identifier 525, the current user is able to easily select the correct user/server combination and subsequently the desired template. Although an email address is specifically mentioned, it is contemplated that another identifier may be used to identify a particular user when duplicate server entries are displayed in the list of servers 520. For example, the identifier may be a username, an icon, an avatar or the like.

Once the appropriate server has been identified and selected by the current user, a list of templates 530 having one or more templates 540 is displayed. As discussed above, the list of servers 520 and the templates 540 associated with each server are displayed in a nested configuration. Such a configuration enables the current user of the computing device to view and select the correct server and desired template when protecting the content item. The list of templates 530 may also include an icon 550 for viewing additional templates 540 in the list of templates 530.

Figure 6:
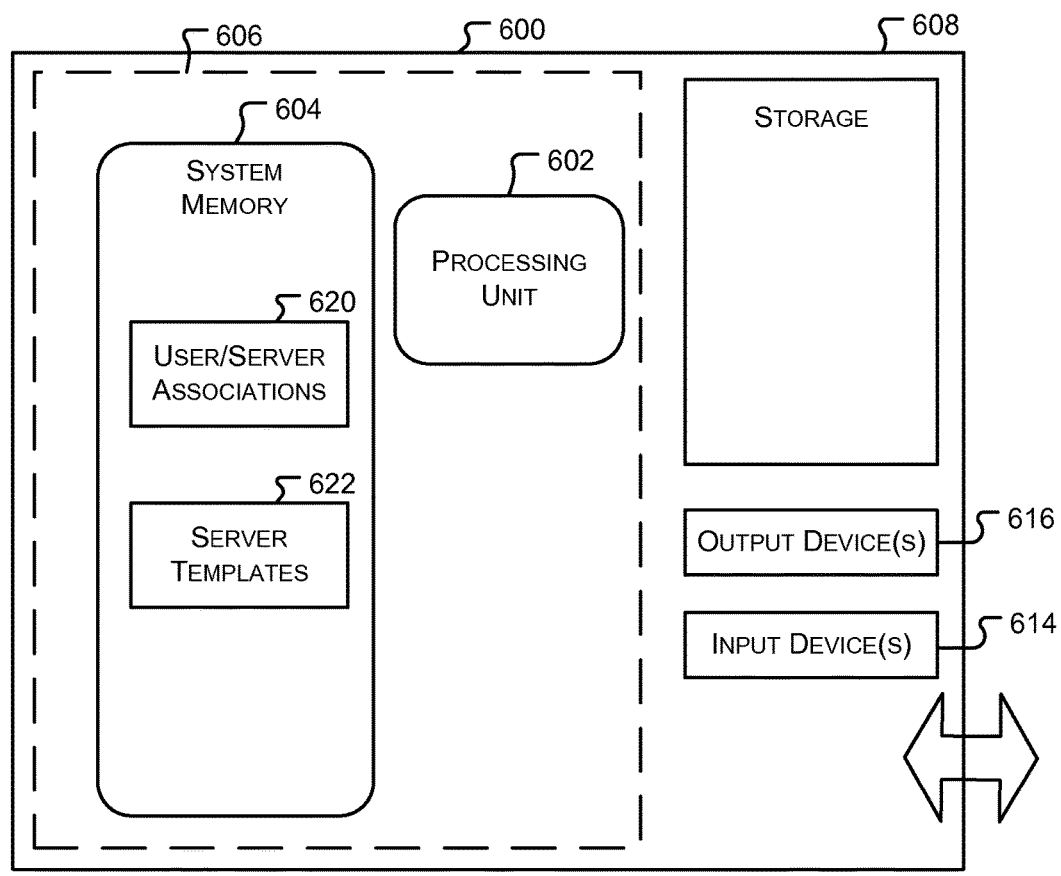
FIG. 6 illustrates a block diagram of a computing environment suitable for implementing embodiments disclosed herein.

FIG. 6 illustrates a general computer system 600, which can be used to implement the embodiments described herein. The computer system 600 is only one example of a computing environment and is not intended to suggest any limitation as to the scope of use or functionality of the computer and network architectures. Neither should the computer system 600 be interpreted as having any dependency or requirement relating to any one or combination of components illustrated in the example computer system 600. In embodiments, system 600 may be used as the computing device 120 described above with respect to FIG. 1.

In its most basic configuration, system 600 typically includes at least one processing unit 602 and memory 604. Depending on the exact configuration and type of computing device, memory 604 may be volatile (such as RAM), non-volatile (such as ROM, flash memory, etc.) or some combination. This most basic configuration is illustrated in FIG. 6 by dashed line 606. System memory 604 stores instructions 620, such as the instructions to associate a user with one or more servers the for which the user has access, and data 622 such as the one or more templates associated with each server that may be stored in a file storage system with storage such as storage 608.

The term computer readable media as used herein may include computer storage media. Computer storage media may include volatile and nonvolatile, removable and non-removable media implemented in any method or technology for storage of information, such as computer readable instructions, data structures, program modules, or other data. System memory 604, removable storage, and non-removable storage 608 are all computer storage media examples (e.g. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 614 such as a keyboard, a mouse, a pen, a sound input device, a touch input device, etc. In another embodiment, the computing device 600 may be coupled to a camera (not shown) that may be operative to record a user and capture motions and/or gestures made by a user. Consistent with other embodiments described herein, the camera may comprise any motion detection device capable of detecting the movement of the user. For example, the camera may comprise a Microsoft® Kinect® motion capture device comprising a plurality of cameras and a plurality of microphones. Output device(s) 616 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments disclosed may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing continuous access to a resource may operate via application-specific logic integrated with other components of the computing device/system 600 on the single integrated circuit (chip).

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments. In addition, terms such as "first," "second," "third" and the like are used herein to distinguish between elements and between processes; however, no particular order or importance is implied by such terms unless otherwise stated.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

I claim:

1. A method for protecting a content item, the method comprising:
   determining a relationship between a user and two or more servers, wherein the two or more servers are configured to manage information rights for a content item;
   in response to receiving a request from the user to protect the content item, displaying a list of the two or more servers, wherein the list of the two or more servers is displayed in a user interface within an application used to create the content item; and displaying a list of templates supported by at least one of the two or more servers, wherein the list of the predefined templates is displayed in the user interface within the application used to create the content item, and wherein the one or more templates identify information rights to be applied to the content item by a selected one of the two or more servers;

receiving a selection of the one or more templates; and applying the information rights of the selected template to the content item.

2. The method of claim 1, wherein the relationship between the user and the two or more servers is established by an administrator.

3. The method of claim 1, wherein the relationship between the user and the two or more servers is established when a protected content item is received from another user, wherein the protected content item is protected by the one or more servers.

4. The method of claim 1, wherein displaying a list of one or more servers includes displaying an email address associated with at least one of the one or more servers.

5. The method of claim 1, wherein at least one of the one or more templates supported by each of the two or more servers is specific to each of the one or more servers.

6. The method of claim 1, wherein the list of two or more servers is maintained locally.

7. The method of claim 1, wherein the user credentials are associated with an application used to create the content item.

8. The method of claim 1, wherein the list of the two or more servers and the one or more templates associated with at least one of the two or more servers are displayed in a nested configuration on a single user interface.

9. A computer-readable storage device encoding computer executable instructions that, when executed by at least one processor, perform a method for protecting a content item, the method comprising:

determining a relationship between a user and one or more servers, wherein the two or more servers are configured to manage information rights for a content item;

to receiving a request to protect the content item;

displaying a list of the two or more servers in a user interface within an application used to create the content item; and displaying in the user interface one or more templates supported by the selected one of the two or more servers, wherein the one or more templates identify information rights to be applied to the content item by selected one of the two or more servers;

receiving a selection of the one or more templates; and applying the information rights of the selected template to the content item.

10. The computer-readable storage device of claim 9, wherein the relationship between the user and the two or more servers is established by an administrator.

11. The computer-readable storage device of claim 9, the method further comprising establishing a relationship between the user and the two or more servers when a protected content item is received from another user, wherein the protected content item is protected by the one or more servers.

12. The computer-readable storage device of claim 9, wherein displaying a list of two or more servers includes displaying an email address associated with at least one of the one or more servers.

13. The computer-readable storage device of claim 9, wherein at least one of the one or more templates supported by each of the two or more servers is specific to each of the one or more servers.

14. The computer-readable storage device of claim 9, wherein the list of two or more servers is maintained locally.

15. The computer-readable storage device of claim 9, further comprising receiving user credentials, wherein the user credentials are associated with an application used to create the content item.

16. The computer-readable storage device of claim 9, wherein the list of the two or more servers and the one or more templates associated with at least one of the two or more servers are displayed in a nested configuration on a single user interface.

17. A computer system for protecting a content item, the system comprising:

one or more processors; and a memory coupled to the one or more processors, the memory for storing instructions that, when executed by the one or more processors, cause the one or more processors to perform a method, the method comprising:

in response to receiving a request from the user to protect the content item, displaying a list of two or more servers within an application used to create the content item; and displaying in the user interface one or more templates supported by the selected one of the one or more servers, wherein the one or more templates identify information rights to be applied to the content item;

receiving a selection of the one or more templates; and applying the information rights of the selected template to the content item.

18. The computer system of claim 17, wherein the relationship between the user and the two or more servers is established by an administrator.

19. The computer system of claim 17, wherein the relationship between the user and the two or more servers is established when a protected content item is received from another user, wherein the protected content item is protected by the two or more servers.

20. The computer system of claim 17, wherein the list of the two or more servers and the one or more templates associated with at least one of the two or more servers are displayed in a nested configuration on a single user interface.

* * * * *